(12) United States Patent
Antila

(10) Patent No.: US 6,816,163 B2
(45) Date of Patent: Nov. 9, 2004

(54) UPDATING IMAGE FRAMES ON A SCREEN COMPRISING MEMORY

(75) Inventor: Mika Antila, Tampere (FI)

(73) Assignee: Nokia Corporation, Espoo (FI)

( * ) Notice: Subject to any disclaimer, the term of this patent is extended or adjusted under 35 U.S.C. 154(b) by 143 days.

(21) Appl. No.: 10/005,061

(22) Filed: Dec. 4, 2001

(65) Prior Publication Data

US 2002/0080134 A1 Jun. 27, 2002

(30) Foreign Application Priority Data

Dec. 4, 2000 (FI) .............................................. 20002649

(51) Int. Cl.⁷ ................................................ G09G 5/36
(52) U.S. Cl. ....................... 345/545; 345/213; 713/400; 713/500
(58) Field of Search ................................ 345/100–500, 345/534, 545, 501, 530, 536; 713/400, 500, 600

(56) References Cited

U.S. PATENT DOCUMENTS

| | | | |
|---|---|---|---|
| 4,231,063 A | 10/1980 | Ito et al. ..................... 358/148 |
| 4,498,098 A | 2/1985 | Stell ............................ 358/22 |
| 5,243,447 A | 9/1993 | Bodenkamp et al. ....... 345/133 |
| 5,555,027 A | 9/1996 | Takeuchi ..................... 348/581 |
| 5,587,726 A | * 12/1996 | Moffat ........................ 345/201 |
| 5,764,240 A | 6/1998 | Herz ........................... 345/508 |
| 5,821,910 A | * 10/1998 | Shay ............................ 345/99 |
| 5,861,879 A | 1/1999 | Shimizu et al. ............. 345/213 |
| 6,054,980 A | 4/2000 | Eglit ........................... 345/204 |
| 6,366,572 B1 | * 4/2002 | Esterberg et al. ........... 370/343 |
| 6,581,164 B1 | * 6/2003 | Felts, III et al. ............ 713/400 |
| 6,646,651 B1 | * 11/2003 | Katsura et al. ............. 345/593 |

FOREIGN PATENT DOCUMENTS

| | | |
|---|---|---|
| EP | 0525986 | 2/1993 |
| EP | 1143331 | 10/2001 |
| FR | 2570566 | 3/1986 |

* cited by examiner

*Primary Examiner*—Kee M. Tung
(74) *Attorney, Agent, or Firm*—Perman & Green, LLP

(57) ABSTRACT

A method and a display system for updating image frames on a display screen of the display system. In the system, image frames comprising a frame and line synchronization signal are transferred from a control system to a display unit. The display unit comprises a display screen for displaying image frames, a frame buffer for buffering the image frames before they are transferred via a transfer bus to the screen, and a display interface for receiving image frames from the control system to the frame buffer. A frame and line synchronization signal are coupled to the control system from an image frame to be updated to the screen, and the control system is timed based on pulses comprised by the frame and line synchronization signal to input a new image frame to the frame buffer such that the new image frame is not stored onto the image frame being updated.

11 Claims, 1 Drawing Sheet

UPDATING IMAGE FRAMES ON A SCREEN COMPRISING MEMORY

BACKGROUND OF THE INVENTION

The invention relates to updating image frames on a screen, particularly on screens comprising memory.

Display units are used for example in different computer systems and portable terminals, such as mobile stations, for displaying text and images to the user of the device. A display signal, typically comprising a display data signal and a synchronization signal, is input to the display unit. The display data signal comprises image frames that are distinguished from each other by means of a frame synchronization signal comprised by the synchronization signal. The synchronization signal also comprises a line synchronization signal for determining the separation of the lines comprised by one image frame.

Image frames are displayed to the user of a device by means of a display screen that receives image frames at an encoding rate that thus determines the number of image frames received in a time unit. Image frames are updated on the screen at a frequency called screen refresh rate. For each display unit, the manufacturer typically defines a target refresh rate that is determined according to the properties of the screen and the interfaces associated therewith. Since the costs of a display unit typically have to be kept within given limits, the above properties also set a maximum value for the target refresh rate. This may lead to a situation where the refresh rate to be used is lower than the encoding rate at which the display unit receives image frames. In this case the display unit has to convert the frame frequency by adapting the image frames received at the encoding rate to be displayed on the screen at the refresh rate.

Modern display units, particularly suitable for displaying moving image, such as video or various games, typically comprise memory for buffering image frames before the image frames are displayed on the screen. One image frame can typically be stored in the available buffer memory, allowing the frame frequency to be converted by reading the data comprised by the stored image frame and updating it to the screen at the refresh rate used.

The problem in the above arrangement is the limited size of the buffer memory available in display units, which easily causes what is known as tearing to the image displayed on the screen, i.e. one part of the image displayed on the screen is composed of one image frame and another part of another image frame. On the screen this is visible as flashing lines or breaking in a laterally moving object. Tearing results from a new image frame being stored in the buffer memory before the previous image frame is entirely updated on the screen.

To avoid tearing, the display unit could use a larger buffer memory having sufficient capacity for storing for example two image frames, ensuring that a new image frame would not be stored onto a image frame to be updated to the screen and still residing in the memory before the previous image frame is entirely updated to the screen. However, a larger buffer memory causes extra costs and the space it requires becomes a problem particularly in small devices, such as mobile stations. This means that a larger buffer memory would have to be integrated into the same IC circuit together with other signal-generating components, which may be impossible to implement sufficiently cost-effectively.

Various software-based solutions are also known for converting the frame frequency, in which the control system of the display unit converts image frames received at the encoding rate into the refresh rate in accordance with instructions given by the microprocessor. One such method is known from U.S. Pat. No. 6,054,980. However, the drawback of such methods is consumption of processing power and memory.

BRIEF DESCRIPTION OF THE INVENTION

The object of the invention is thus to provide a method and an apparatus implementing the method so as to avoid the above problems. The objects of the invention are achieved with a method, a system and a mobile station characterized by what is stated in the independent claims. The preferred embodiments of the invention are disclosed in the dependent claims.

The invention is based on coupling synchronization signals from an image frame to be displayed on the screen also to the control system, allowing the control system to be timed on the basis of synchronization signals, particularly the pulses comprised thereby, to input a new image frame to the frame buffer such that the new image frame is not stored onto a image frame being updated to the screen. The synchronization signals are used to control the storage of a new image frame in the frame buffer such that each line of the screen is updated before the frame information to be created on the corresponding line of the following image frame is stored in the frame buffer.

In accordance with a preferred embodiment, feedback synchronization signals are combined to form one signal, allowing the control system to interpret both synchronization signals correctly from said one signal. The synchronization signals are preferably combined to form one signal by means of a logic OR or XOR (Exclusive OR) operation.

The advantage of the method and system of the invention is the avoidance of tearing and the ability to ensure the timely update of image frames to the screen. A further advantage is that updating the frame buffer on the basis of synchronization signals does not consume the processing power or memory of the control system since no special program code is needed to carry out the conversion of the frame frequency. Still another advantage is the ability to utilize the existing frame buffer of the display unit; no larger buffer memory is needed for the simultaneous storage of several image frames. A further advantage is that the feedback of synchronization signals according to the invention is extremely simple to implement.

BRIEF DESCRIPTION OF THE FIGURES

In the following, the invention will be described in greater detail in connection with preferred embodiments with reference to the accompanying drawings, in which.

DETAILED DESCRIPTION OF THE INVENTION

The structure of a display system, used typically in mobile stations, is described next with reference to FIG. 1. However, the invention is not limited only to displays of mobile stations, but is applicable to any display unit using frame and line synchronization signals to separate image frames and the lines comprised by them.

Figure 1:
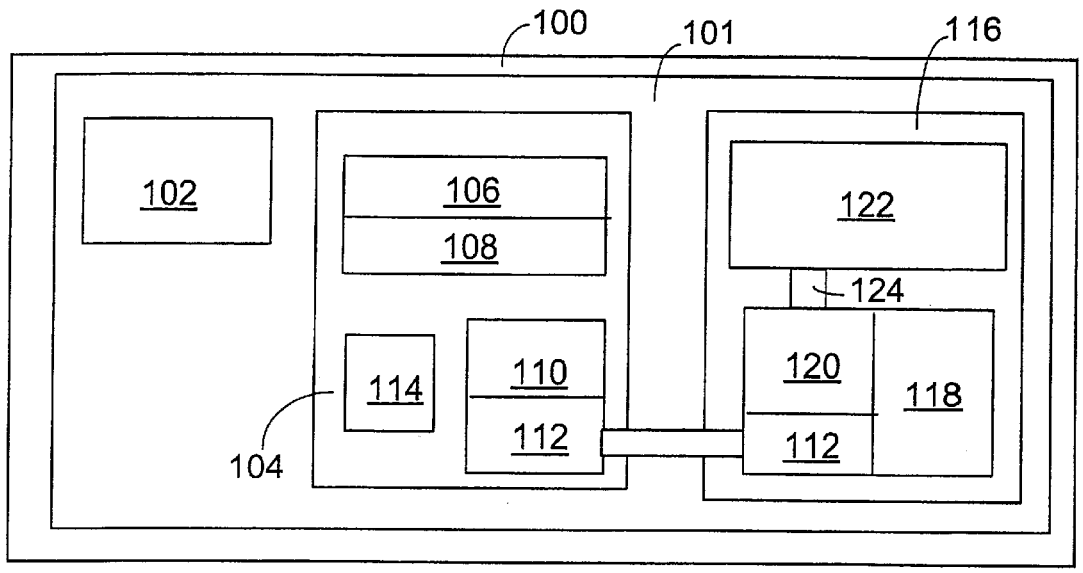
FIG. 1 is a block diagram of the structure of a display system.

In FIG. 1 a display system 101 integrated into a mobile station 100 comprises a memory 102 for storing and inputting image frame information to be displayed to a control system 104. The control system 104 comprises functionalities that are associated with editing image frame information and can be implemented for example as part of the functionalities of the mobile station's master control unit 106 (MCU) and digital signal processor 108 (DSP). Image frames are updated from the memory 102 to a display unit 116 by means of a direct memory access controller 110 (DMA), whereby the DMA controller 110 retrieves image frame information from the memory 102 and transfers it directly via a display interface 112 to the display unit without the MCU 106 or the DSP 108 issuing commands to transfer the image frame information. The MCU 106 only determines the speed for the DMA controller 110, that is, how many image frames are to be transferred in a time unit, i.e. the encoding rate. Accordingly, the DMA controller inputs a continuous data flow comprising image frames from the memory 102 to the display unit 116. In addition, the control system 104 may comprise a graphics accelerator 114 for adapting two-dimensional or three-dimensional graphics as suitable as possible for the properties of the display unit 116.

The display unit 116 comprises a display interface 112, a display controller 118 and a frame buffer 120 typically integrated into it for buffering image frames before they are displayed on a screen. The display unit 116 also comprises a screen 122 and a bus 124 for transferring image frame information from the frame buffer 120 to the screen 122. Typically one image frame at a time is stored in the frame buffer, and the image frame is updated to the screen 122 at the refresh rate set to the display controller 118.

The image frame information to be input to the screen comprises a display data signal and a synchronization signal. The display data signal comprises image frames that are distinguished from each other by means of a frame synchronization signal comprised by the synchronization signal. The synchronization signal also comprises a line synchronization signal for determining the mutual separation of the lines comprised by one image frame. A pulse comprised by the frame synchronization signal is transmitted after each image frame, the pulse of the frame synchronization signal indicating the start of the update of the following image frame to the screen. A pulse comprised by the line synchronization signal is transmitted after each line feed of an image frame, the pulse of the line synchronization signal indicating the start of the update of the following line of the image frame to the screen. Depending on the display unit, the length of the pulse of a frame synchronization signal is typically about 2 to 6 times the time taken up by the update of one line. The length of the pulse of a line synchronization signal is a fraction of the time taken up by the update of one line. Consequently, the pulse of a frame synchronization signal is dozens or hundreds of times longer than the pulse of a line synchronization signal.

In accordance with the invention, the above synchronization signals and their pulses can be utilized to avoid tearing on the screen. In accordance with the invention, said synchronization signals are led by feedback to the control system of the display system, particularly to the MCU, from which a control command, generated on the basis of the synchronization signals, is further transferred to the DMA controller for storing a new image frame in the frame buffer. Said synchronization signals thus comprise information on the progress of the update of the screen, allowing a new image frame to be stored in the frame buffer at precisely the right moment, thus preventing a new image frame from being stored in the frame buffer onto the image frame to be updated on the screen until the previous image frame is completely updated to the screen. This preferably avoids tearing and ensures timely update of image frames to the screen. A further advantage is that updating the frame buffer on the basis of synchronization signals does not use up processing power of the control system or memory, since no special program code is needed to change the frame frequency.

Image frames can also be updated to the frame buffer according to the invention in a display system not comprising a DMA controller. In this case image frames are updated from the memory 102 to the display unit 116 with the DSP, which is controlled by control commands transmitted by the MCU. Part of said control commands, in turn, is preferably formed from the feedback synchronization signals in the above-described manner. However, such an arrangement loads the DSP significantly more than an image frame update carried out by means of a DMA controller.

In accordance with a preferred embodiment of the invention, the synchronization signals may be fed back to the control system as one signal, allowing the control system to interpret correctly both synchronization signals from said one signal. Since the lengths of the pulses comprised by the synchronization signals, i.e. the frame synchronization signal and the line synchronization signal, are notably different, the synchronization signals can be combined to form one signal by means of a logic OR or XOR (Exclusive OR) operation, for example. Such a combined signal thus comprises long pulses of a frame synchronization signal, during the duration of which several dozens or hundreds of short pulses of a line synchronization signal occur. From such a signal, the control system of the display system easily reconstructs the original synchronization signals, on the basis of which the update of the frame buffer can be synchronized suitable for the update of the screen.

Figure 2A:
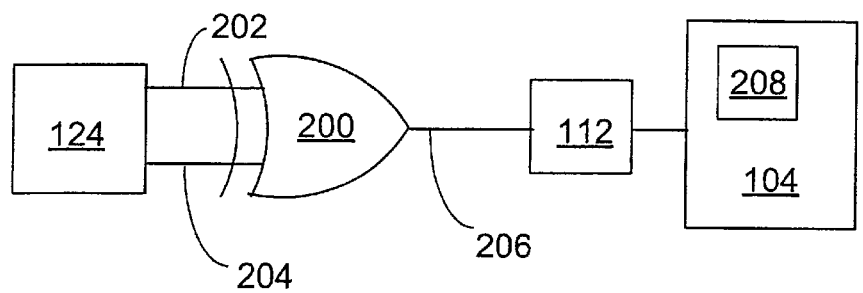
FIG. 2a is a block diagram of coupling synchronization signals to the control system of a display system according to a preferred embodiment of the invention.
Figure 2B:
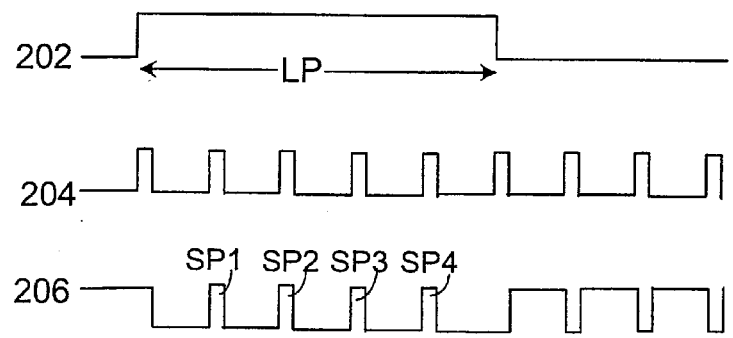
FIG. 2b shows the combination of synchronization signals to form one signal according to a preferred embodiment of the invention.

This embodiment is illustrated in FIGS. 2a and 2b. FIG. 2a schematically shows an XOR circuit 200, to whose inputs 202, 204 a frame synchronization signal and a line synchronization signal, taken for example from an image frame information transfer bus 124, are input, and from whose output 206 is obtained a combined signal that is input via the display interface 112 to the control system 104 of the display system. The frame synchronization signal and the line synchronization signal can naturally be taken from some other component of the display module, such as the display controller 118. The control system preferably comprises a counter 208 whose value is incremented by each short pulse received. In response to a long pulse, the counter is reset to zero. Since the durations of a long and a short pulse are significantly different, such observation logic is easy to implement. Consequently, the value of the counter always indicates the line of the screen that is being updated.

FIG. 2b schematically shows the combination of a frame synchronization signal and a line synchronization signal to form one signal by means of an XOR operation. By way of illustration, the difference between pulse lengths in FIG. 2b does not correspond to the real difference between pulse lengths, but the pulse of the frame synchronization signal with respect to the pulse of the line synchronization signal is shown considerably shorter than is real. FIG. 2b clearly shows how several (in reality dozens or hundreds) short pulses SPn (SP1, SP2, . . . ) are generated in a signal obtained from the output 206 during a time corresponding to one long pulse LP. Each short pulse SPn increments the value of the counter 208 during the update of an image frame until all lines of the image frame are updated to the screen and the counter has reached the maximum value determined according to the lines of the screen. The following long pulse LP zeroes the counter, and the update of the following image frame is observed from the start by means of the counter value, which again increases in response to short pulses observed.

The above described combination of synchronization signals can be implemented in the same way by means of an OR operation, for example. A combined signal is generated also in this case and comprises long pulses of a frame synchronization signal, during the duration of which several short pulses of a line synchronization signal occur. It is apparent to a person skilled in the art that to combine signals comprising pulses of considerably different lengths such that the original synchronization signals are easily reconstructed from the combined signal can be implemented in a variety of ways using different logical operations. Thus the implementation of the invention is not restricted to the above described OR and XOR operations.

To avoid tearing, each line of the screen has to be updated before the image frame information to be formed on the corresponding line of the next image frame is stored in the frame buffer. This is preferably ensured by an interrupt being programmed in the counter, whereby the maximum value of the counter, the value being determined according to the number of lines on the screen, is used to control the control system to issue a command to the DMA controller to update a new image frame to the frame buffer at the same time as the counter receives a long pulse and is zeroed. In case a security margin is needed in the update of the frame buffer, owing to a slow display interface 112, for example, the counter interrupt can be programmed to take place earlier, e.g. on line 150 on a 220-line screen. Advancing the update command of the DMA controller suitably allows interference in the update of image frames caused by possible delays on the transfer bus and, at the same time, the coincidence of the update of the screen and the update of the frame buffer on the same line to be avoided.

The feedback of synchronization signals according to the invention is extremely simple to implement. If for example the above described OR or XOR operations are used to combine synchronization signals to form one signal, the necessary OR or XOR operation may be executed by adding any OR circuit or XOR circuit, respectively, known per se, to the display unit, to the inputs of which circuit a frame synchronization signal and a line synchronization signal are applied, and from whose output a combined signal is obtained that is applied to the display connector of the display interface, to which connector one pin is added, if necessary, to lead to signal to the control system. It is apparent to a person skilled in the art that OR and XOR circuits can be implemented in a variety of ways by combining different logics components.

The display system and the method of updating image frames according to the invention are most preferably implemented in a mobile station, since the structurally simple implementation does not cause any essential increase in the size and weight of a mobile station, which is important for the design of mobile stations. Furthermore, processing signals and image frames in accordance with the invention does not require high processing power, and hence the batteries of mobile stations stay loaded longer.

It is apparent to a person skilled in the art that, as technology advances, the basic idea of the invention can be implemented in a variety of ways. The invention and its embodiments are thus not limited to the above examples, but may vary within the scope of the claims.

What is claimed is:

1. A method of updating image frames on a screen of a display system, which comprises a control system and a display unit comprising a screen for displaying image frames, a transfer bus for transferring image frames to the screen, a frame buffer for buffering the image frames before the image frames are transferred via the transfer bus to the screen and for receiving image frames of the display interface from the control system to the frame buffer, the method comprising:

transferring image frames comprising a frame synchronization signal and a line synchronization signal in the display system from the control system to the display unit;

combining said frame synchronization signal and line synchronization signal to form one timing signal;

coupling said timing signal to the control system;

detecting said frame synchronization signal and line synchronization signal from said timing signal in the control system; and timing said control system on the basis of pulses comprised by said frame synchronization signal and line synchronization signal to input a new image frame to the frame buffer such that the new image frame is not stored onto said image frame to be updated to the screen.

2. A method as claimed in claim 1, wherein said frame synchronization signal and line synchronization signal are combined by means of an XOR circuit.

3. A method as claimed in claim 1, wherein said frame synchronization signal and line synchronization signal are combined by means of an OR circuit.

4. A method as claimed in claim 1, further comprising timing said control system with a counter, whose counter value is incremented by one in response to a received pulse of a line synchronization signal, and which is zeroed in response to a received pulse of a frame synchronization signal.

5. A method as claimed in claim 4, further comprising
inputting image frames from said control system via the display interface to the frame buffer by means of a DMA, controller and
programming an interrupt to take place in said counter at most at the maximum value of the counter, in response to which value the DMA, controller is controlled to input a new image frame to the frame buffer.

6. A display system on whose display screen image frames are arranged to be updated and comprising:

a display data signal comprising image information;

a frame synchronization signal for distinguishing successive image frames from each other;

a line synchronization signal for distinguishing successive lines in an image frame from each other;

said display system further comprising:

a display unit comprising a display screen for displaying image frames, a transfer bus for transferring image frames to the screen, a frame buffer for buffering the image frames before the image frames are transferred via the transfer bus to the screen at a refresh rate, and a display interface for receiving the image frames to the frame buffer;

a control system arranged to input image frames via the display interface to the frame buffer at an encoding rate;

coupling means for combining said frame synchronization signal and line synchronization signal from an image frame to be updated to the screen to form one timing signal and for coupling said timing signal to said control system;

detecting means for detecting said frame synchronization signal and line synchronization signal from said timing signal; and timing means for timing said control system on the basis of pulses included in said frame synchronization signal and line synchronization signal to input a new image frame to the frame buffer such that the new image frame is not stored onto said image frame to be updated to the screen.

7. A display system as claimed in claim 6, wherein said coupling means comprise an XOR circuit for combining said frame synchronization signal and line synchronization signal.

8. A display system as claimed in claim 6, wherein said coupling means comprise an OR circuit for combining said frame synchronization signal and line synchronization signal.

9. A display system as claimed in claim 6, wherein said timing means comprise a counter arranged to increment the counter value by one in response to a received pulse of a line synchronization signal, and to zero the counter value in response to a received pulse of a frame synchronization signal.

10. A display system as claimed in claim 9, wherein said control system comprises a DMA controller arranged to input image francs via the display interface to the frame buffer and an interrupt is programmed to take place in said counter at most at the maximum value of the counter, in response to which value the DMA controller is controlled to input a new image frame to the frame buffer.

11. A mobile station, comprising a display system as claimed in claim 6.

* * * * *

UNITED STATES PATENT AND TRADEMARK OFFICE
CERTIFICATE OF CORRECTION

PATENT NO. : 6,816,163 B2
DATED : November 9, 2004
INVENTOR(S) : Antila

It is certified that error appears in the above-identified patent and that said Letters Patent is hereby corrected as shown below:

Column 6,
Line 51, after "DMA" delete ",".
Line 54, after "DMA" delete ",".

Column 8,
Line 14, delete "francs" and insert -- frames --, therefor.

Signed and Sealed this

Twenty-ninth Day of March, 2005

JON W. DUDAS
*Director of the United States Patent and Trademark Office*